Dec. 14, 1937.    L. R. HEIM    2,102,460
METHOD OF MAKING ROLLER BEARINGS
Filed July 18, 1934    4 Sheets-Sheet 1
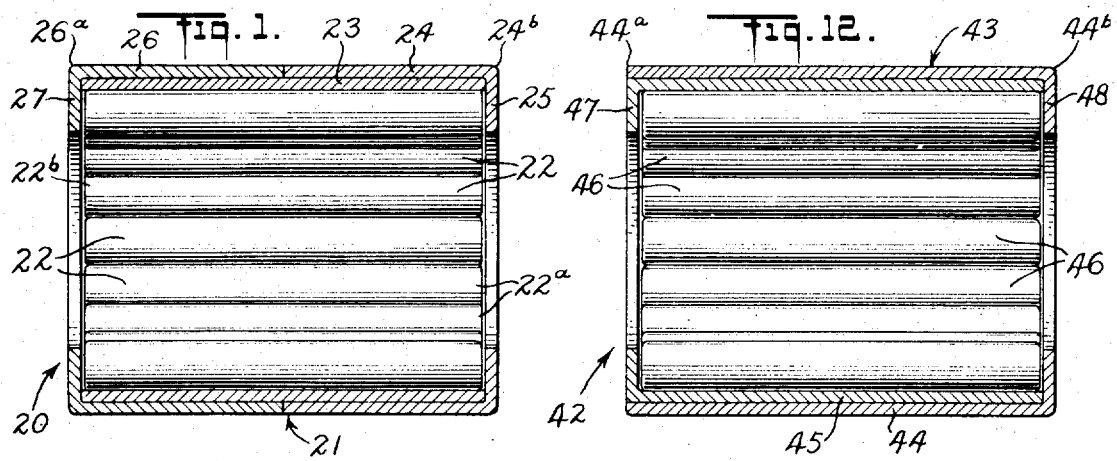
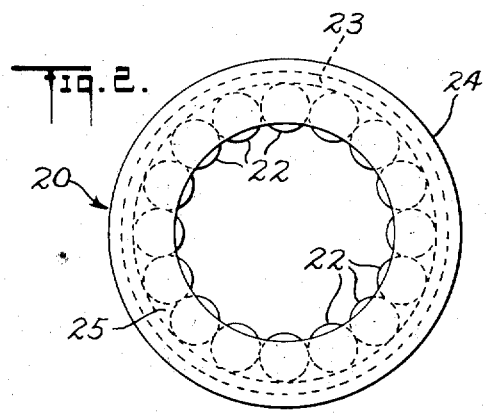
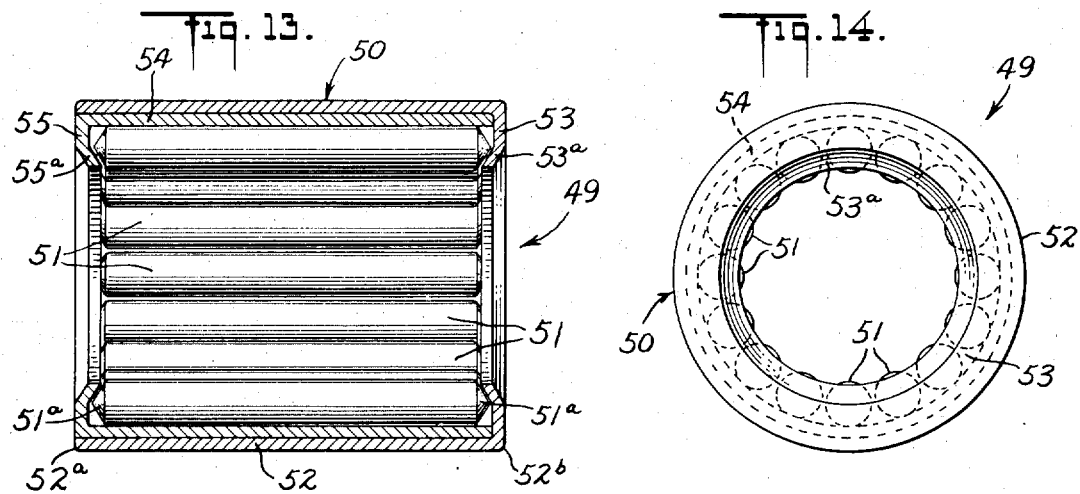
INVENTOR
*Lewis R. Heim*
BY
*Blair, Curtis & Dunne*
ATTORNEYS Dec. 14, 1937.  L. R. HEIM  2,102,460
METHOD OF MAKING ROLLER BEARINGS
Filed July 18, 1934  4 Sheets-Sheet 2
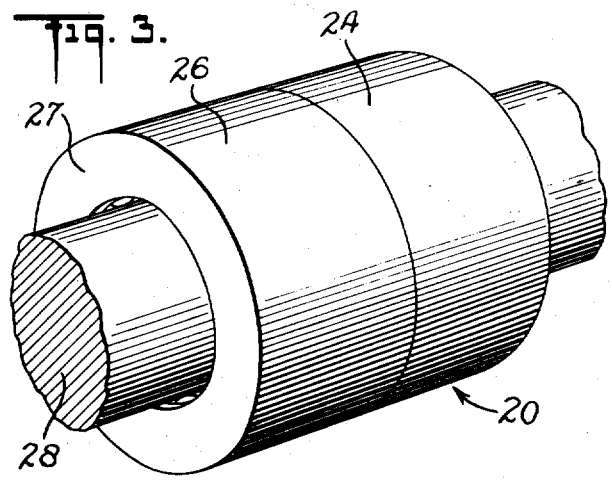
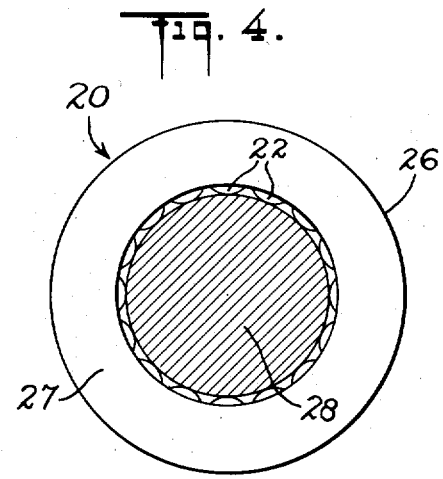
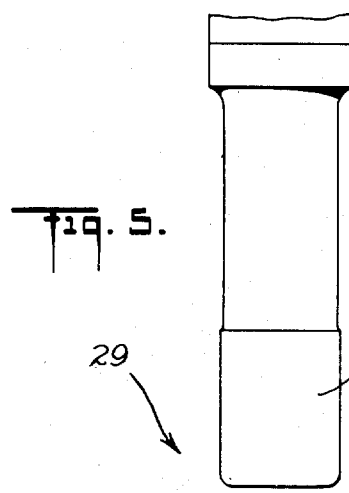
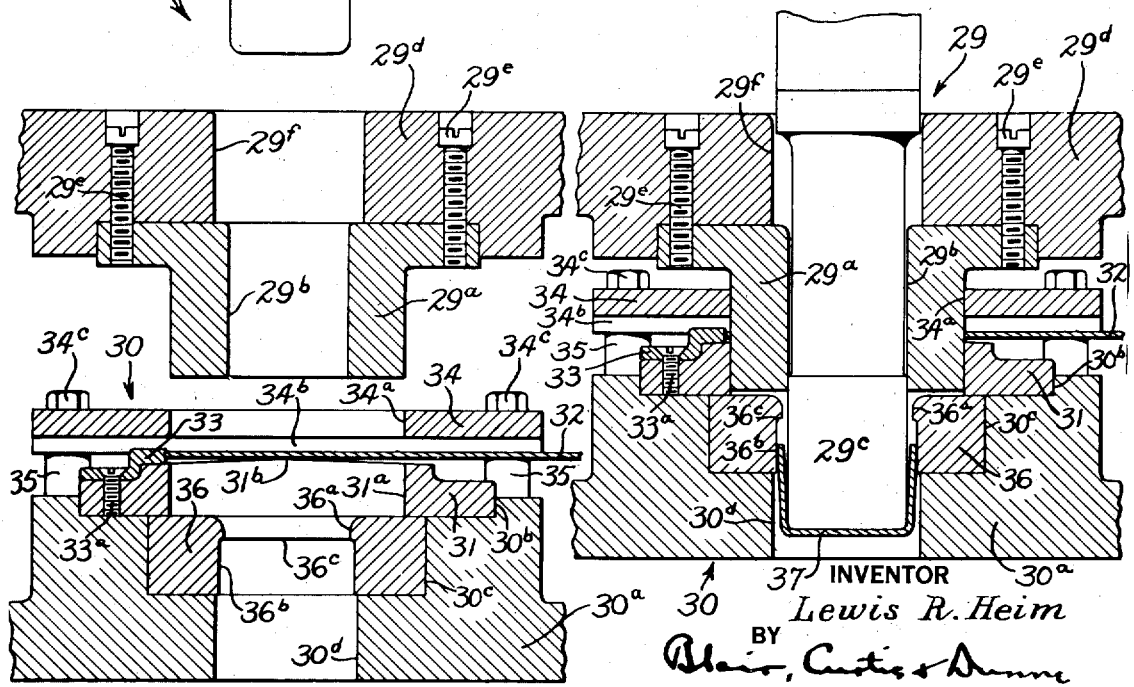
INVENTOR
Lewis R. Heim
BY
ATTORNEYS Dec. 14, 1937.   L. R. HEIM   2,102,460
METHOD OF MAKING ROLLER BEARINGS
Filed July 18, 1934   4 Sheets-Sheet 3
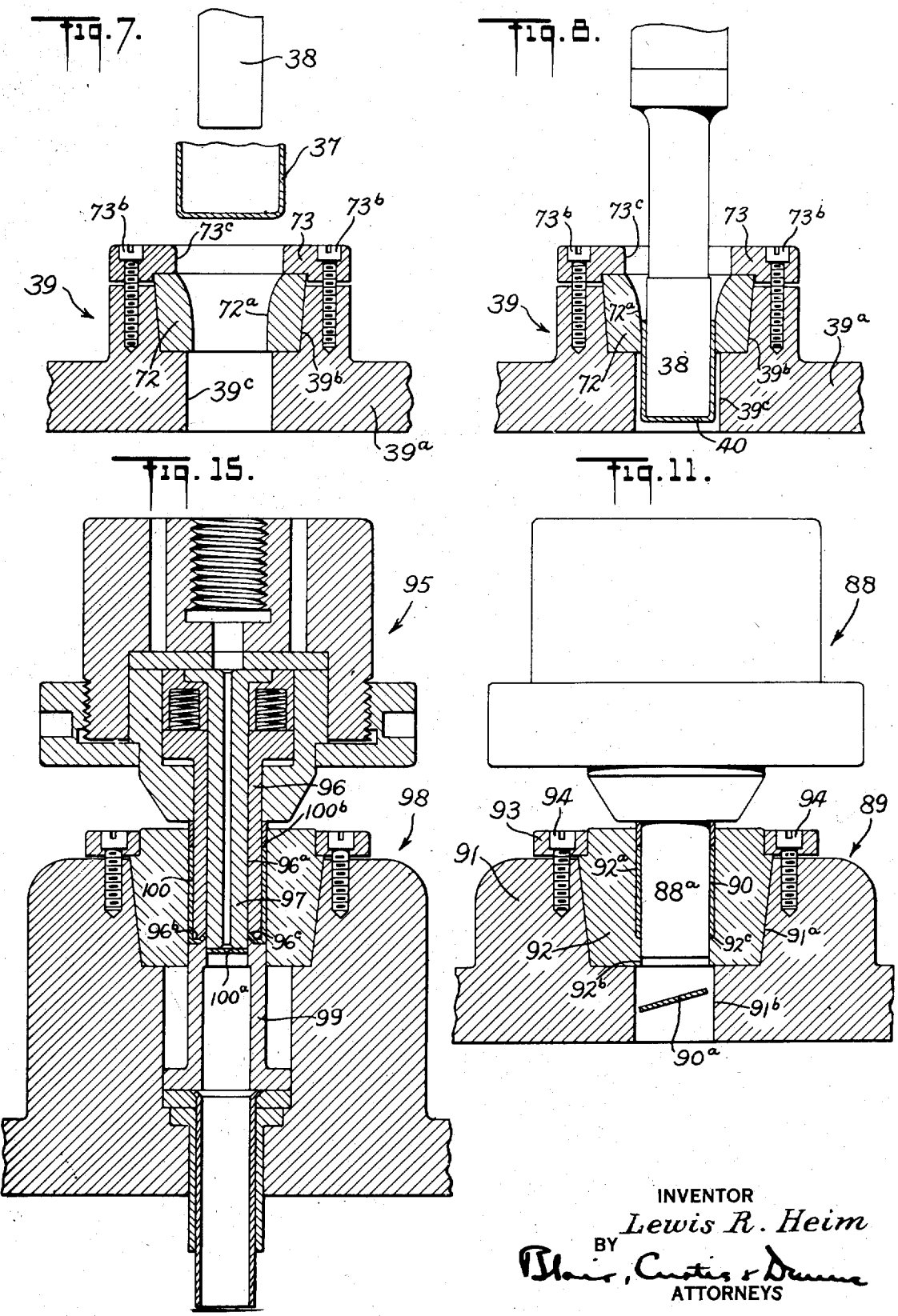
INVENTOR
Lewis R. Heim
BY
Blair, Curtis & Dunne
ATTORNEYS

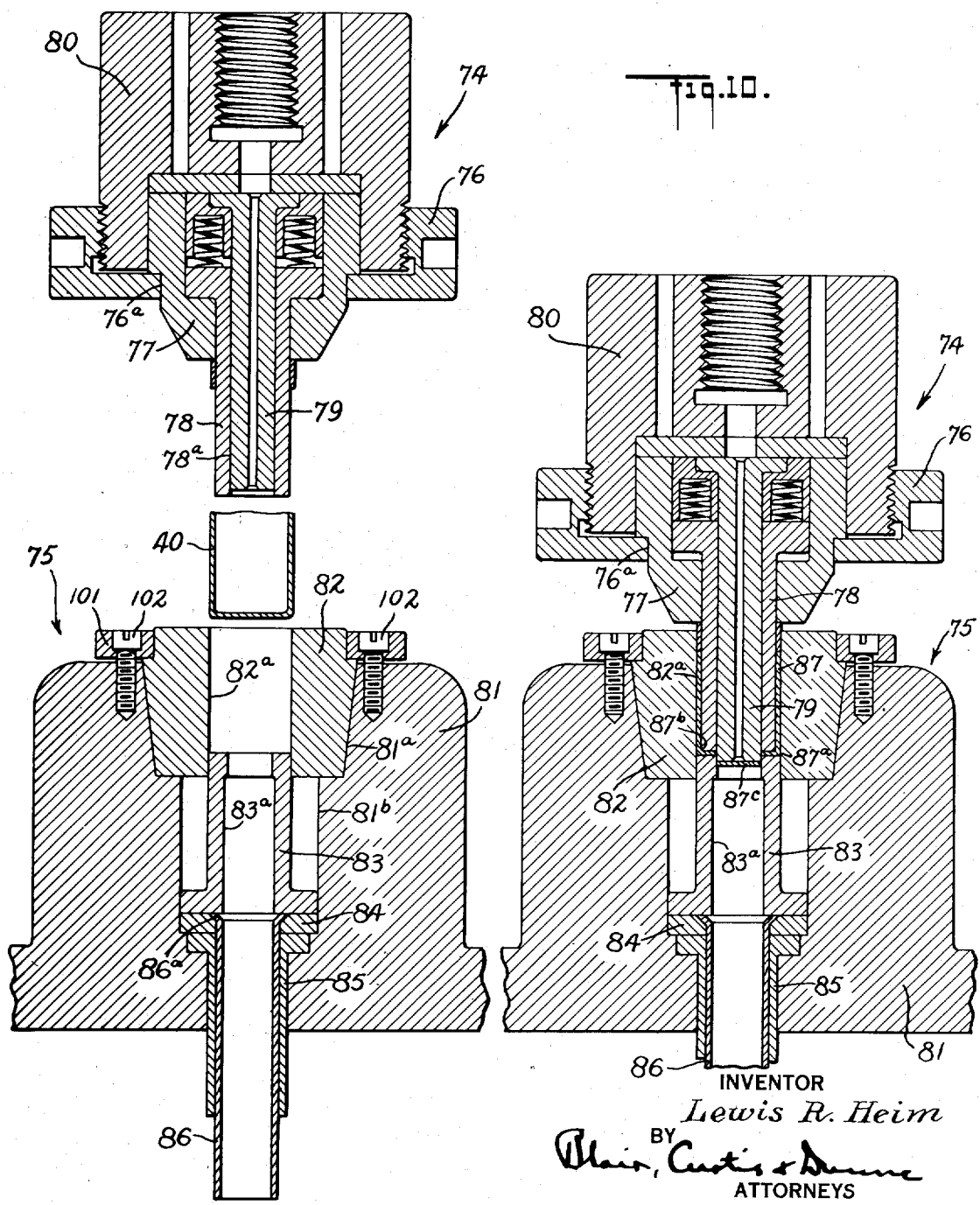

Patented Dec. 14, 1937

2,102,460

UNITED STATES PATENT OFFICE 2,102,460

METHOD OF MAKING ROLLER BEARINGS

Lewis R. Heim, Mount Dora, Fla.

Application July 18, 1934, Serial No. 735,802

16 Claims. (Cl. 29—148.4)

This invention relates to a roller bearing construction and a method of making the same.

One of the objects of this invention is to provide a roller bearing which is light and simple in construction, yet durable and sturdy in use. Another object is to provide a device of the above nature capable of bearing loads heavy in proportion to its size. Another object is to provide a device of the above nature which can be rapidly manufactured in large quantities by unskilled labor without loss of uniformity in size. Another object is to provide a device of the above character, the various parts of which can be formed from inexpensive materials and readily assembled with a minimum expenditure of time and labor. Another object is to provide a device of the above character in which machining operations are reduced to a minimum. Another object is to provide a device of the above character capable of carrying a maximum number of rolls or the like. Another object is to provide a method of making a roller bearing which is simple and conserving of time and labor. Another object is to provide a method of the above nature which may be practically exercised by unskilled labor. Another object is to provide a method of the above nature in which sheet metal may be utilized for the rapid production of various parts of the bearing. Other objects will be in part obvious and in part pointed out hereinafter.

This application is a continuation in part of my co-pending application, Serial No. 499,671, filed December 3, 1930.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which certain steps of my method are generally indicated, and in which is shown one or more of the various possible embodiments of the mechanical features of my invention, Figure 1 is a sectional elevation of a bearing;

Figure 2 is an end elevation of the bearing shown in Figure 1;

Figure 3 is a perspective view of the bearing shown in Figure 1 mounted on a shaft;

Figure 4 is an end elevation of the bearing and shaft shown in Figure 3;

Figures 5-11 and Figure 15 are sectional elevations of various steps in the method of forming various parts of the bearings shown in Figures 1, 12, and 13;

Figure 12 is a sectional elevation of another embodiment of certain features of my bearing;

Figure 13 is a sectional elevation of another embodiment of certain features of my bearing; and Figure 14 is an end elevation of the bearing shown in Figure 13.

Similar reference characters refer to similar parts throughout the several views of the drawings.

As conducive to a clearer understanding of certain features of this invention, it might here be pointed out that the manufacture of anti-friction devices of the above nature are characterized by various conditions not amenable to a high production of bearings of uniform size. Such bearings depend for their uniformity upon various machining operations whereby the various diameters of the different parts of the bearing must be obtained by machining or grinding operations, for example, to achieve the desired size. These methods are not only slow and expensive but are productive of errors with the result that the bearings do not have the necessary uniformity important in devices of this nature. In addition, it is necessary to employ skilled labor to practice this manufacture and accordingly another large item of expense is added. Further difficulties are encountered due to the fact that the rolls or balls, as the case may be, readily fall out of operative position while being installed or shipped, for example, thus causing considerable inconvenience and time-consuming labor in reassembling the bearing. These bearings further have a small roll capacity in relation to the roll race and accordingly their ability to withstand heavy loads in proportion to their size is considerably limited. One of the objects of this invention is to provide a device and method in which the above difficulties, in addition to many others, are rectified.

Referring now to Figure 1 in which one embodiment of my bearing construction is generally indicated at 20, a race generally indicated at 21 has disposed therein a plurality of rolls 22 or the like. Rolls 22 are disposed about the inner periphery of a cylindrical shell 23, this shell being preferably stamped or formed from sheet metal or the like and, under certain conditions, hardened by suitable heat treatment, all as will be more clearly described hereinafter. Shell 23 preferably slightly exceeds rolls 22 in length.

Preferably I provide a sleeve-like member 24 related to shell 23 preferably by a force or driven fit, thus obviating the necessity of a separate part to retain shell 23 and sleeve 24 in related assembly and, by the same token, expediting the production and assembly of the bearing. Edges 26a and 24b of shells 26 and 24 are preferably slightly rounded or beveled to facilitate the insertion of bearing 20 into a bore provided for its reception. A flange-like projection 25 is preferably integral with sleeve 24 and extends therefrom radially toward the axis of bearing 20 a suitable distance to substantially cover the adjacent ends 22a of rolls 22 as more clearly shown in Figure 2. A second sleeve member 26 substantially similar to sleeve 24 and having a flange 27 is related to shell 23 preferably by a force or driven fit. Thus flange 27 substantially covers the adjacent ends 22b of rolls 22. Preferably the inner diameter of shell 23 and the diameters of rolls 22 are so proportioned that rolls 22 mutually sustain one another against radial displacement. In other words each of rolls 22 acts as a keystone, and this feature, together with limitation against axial displacement provided by flanges 25 and 27, renders the rolls immune from any sort of displacement, thus greatly expediting shipping and installation and saving the inconvenience, time, and labor of reassembling the bearing as would be the case otherwise. This construction further obviates the necessity of providing a cage or similar retaining device. Furthermore, the peculiar keystone or overlapping relation of the rolls 22 results in efficient and highly beneficial self-alignment as the rolls are in such close proximity that variation from their proper axes of rotation is precluded and accordingly the risk of jamming is reduced to a minimum.

As more clearly shown in Figures 3 and 4, the inner periphery of flange 27 is but slightly spaced from a shaft 28 borne by bearing 20. Thus the aperture between flange 27 and shaft 28 is large enough to permit the entrance of a suitable lubricant, but is so small as to prevent the admission of foreign particles that would be injurious to the smooth bearing surfaces of rolls 22 and shell 23.

As pointed out above, shell 23 is preferably formed from suitable flat stock which may be sheet steel. Likewise sleeves 24 and 26 are preferably produced from the same type or kind of sheet steel. As inexpensive manufacture and high production are among the several objects of the invention, I have found it preferable to form shell 23 and sleeves 24 and 26 in suitable automatics by suitably related dies.

While shell 23 and sleeves 24 and 26 may be produced in various ways by various machine tools, I preferably incorporate with a suitable stamping machine (not shown) a cylindrical compound male die generally indicated at 29 in Figure 5 and a female die generally indicated at 30. Die 29 is comprised of a stamping member or die 29a having a bore 29b extending therethrough, in which a forming member or die 29c reciprocates upon actuation by the stamping machine. Stamping die 29a is preferably secured to a carrier 29d by bolts 29e, carrier 29d having a bore 29f larger than and concentric with bore 29b. Thus different sized stamping dies may be readily installed in carrier 29d. Preferably the top edges of bores 29b and 29f are rounded so as to facilitate the entrance of forming die 29c, the bottom edge of which is also preferably rounded.

Female die 30 (Fig. 5) includes a carrier 30a which has formed therein concentric bores 30b, 30c, and 30d. Bore 30b receives a die 31 having a bore 31a which cooperates with stamping die 29a when the stamping machine is operated to cut a circular blank from a piece of flat stock 32. To facilitate the cutting, die 31 preferably is provided with a high point 31b. Thus a shearing action takes place when stamping die 29a is operated.

In order to minimize waste in cutting of the blank from flat stock 32, a stop 33 is secured to die 31 by a screw 33a or the like. Also there is provided a guard 34 having a bore 34a and guide channels 34b, guard 34 being secured to carrier 30a by bolts 34c which extend through guard 34 and spacers 35 and are threaded into carrier 30a. Thus when flat stock 32 is positioned for stamping, it will abut against stop 33 and lie between guides 34b.

Bore 30c receives a drawing die 36 having a bore 36a which cooperates with forming die 29c but which has a diameter greater than that of forming die 29c by an amount equal to twice the desired thickness of the element to be formed or drawn from the blank stamped out of flat stock 32. Preferably the thickness of the element is approximately that of flat stock 32.

Immediately below and slightly larger than bore 36a a concentric bore 36b extends through die 36 to communicate with bore 30d thus forming a shoulder 36c, the purpose of which will be pointed out hereinafter. Bore 36a is preferably rounded at its upper edge to facilitate the entrance of the blank when forced down by die 29c.

From the above it may be seen that dies 29a, 29c, 31, 36 and guard 34 may be readily removed and replaced by similar parts of different size when it is desired to form an element of larger or smaller diameter, or when different dies become dull through long use.

As is more clearly shown in Figure 6, dies 29 and 30 have cooperated through actuation of die 29 by the stamping machine to form a cup-shaped element 37. To form element 37 stamping die 29a is driven downwardly through bore 34a in guard 34 to stamp a circular blank from flat stock 32. The blank falls through bore 31a until it rests on top of die 36. Forming die 29c is then operated to force the blank through bore 36a until the blank is drawn into the shape of element 37. As the blank is drawn through bore 36a portions thereof which ultimately comprise the walls of element 37 are wrinkled and overlap, but, as more metal is drawn through the die, the metal flows and the wrinkles are ironed out into a very smooth, even surface equivalent for most practical purposes to a ground surface.

When element 37 is completely formed so that its top edge is below shoulder 36c, the downward motion of forming die 29c ceases. As die 29c is withdrawn, the top edge of element 37, which has expanded slightly from its close contact with die 29c, abuts against shoulder 36c and when die 29c is completely withdrawn, element 37 falls through bores 36b and 30d into a suitable receptacle.

Element 37 having been thus formed, it is placed in position to be operated on by a different set of dies. As is more clearly shown in Figures 7 and 8, a cylindrical male die 38 and a female die generally indicated at 39 cooperate to form element 37 into a differently shaped element 40 (Figure 8).

Female die 39 is comprised of a carrier 39a which has formed therein a bore 39b preferably frusto-conical in shape which receives a forming die 72 having a bore 72a. Bore 72a is preferably funnel-shaped so as to more readily admit the entrance of element 37. Die 72 is held in place by a clamp 73 bolted to carrier 39a by bolts 73b. Clamp 73 has a bore 73c which registers with the top of bore 72a and acts as a guide for the entrance of element 37. Bore 72a communicates with a concentric bore 39c larger than bore 72a and for a purpose disclosed hereinafter. The diameter of bore 72a is greater than the diameter of forming die 38 by an amount twice the desired thickness of the walls of element 37, this thickness being preferably that of flat stock 32 (Figure 5).

As is more clearly shown in Figure 8, forming die 38 has forced element 37 through bore 72a into bore 39c to form element 40. Accordingly there is a further flowing of metal, as pointed out above, and any irregularities which may have been in the walls of element 37 are ironed out to result in very smooth surfaces, equivalent to ground surfaces, on element 40. As the diameters of die 38 and bore 72a are smaller than the inner and outer diameters of element 37 respectively, these latter diameters are reduced and the depth of element 40 is greater than that of element 37.

When die 38 has reached the bottom of its travel, element 40 will lie wholly within bore 39c. When die 38 is withdrawn, the top of element 40 abuts against the bottom of die 72 and is accordingly freed from die 38 as it is withdrawn. When element 40 is completely disassociated from die 38 it drops through bore 39c into a suitable receptacle.

Referring now to Figures 9 and 10, element 40 is next subjected to a sizing operation by a compound male die generally indicated at 74 and a compound female die generally indicated at 75. Male die 74 is comprised of a carrier 76 having a bore 76a which receives a die holder 77. Holder 77 is suitably bored to receive a forming die 78 which in turn has a bore 78a in which a stamping die 79 is reciprocably disposed. Dies 78 and 79 and holder 77 are held in assembled operating relationship by a plug 80 or the like suitably secured to carrier 76 as by a threaded relation therebetween.

Female die 75 is preferably comprised of a carrier 81 having a frusto-conical bore 81a which communicates with a downwardly extending bore 81b. Bore 81a receives a forming die 82 which is secured to carrier 81 by a circular clamp 101 through which extends bolts 102 threaded into carrier 81. Die 82 has a bore 82a which slidably receives element 40 and also a die 83, the bottom of which is in sliding relation with bore 81b.

Die 83 is secured against downward movement by a washer 84 and the top of a bushing 85 both of which are suitably seated on shoulders in bore 81b. Die 83 is movable upwardly, however, by the upthrust of a sleeve 86 slidably mounted in bushing 85. Sleeve 86 is prevented from dropping out of bushing 85 by a flange 86a which abuts on a suitable bevel on washer 84.

With reference to Figure 10, dies 74 and 75 have coacted to form from element 40 an element 87. Thus forming die 78 has pressed the bottom of element 40 against the top of die 83 to form a square edge 87a and a square corner 87b, and die 79 has been forced downwardly to stamp a disc 87c from the bottom of element 40. Disc 87c falls through bore 83a and the bore of sleeve 86 for convenient disposal.

To accomplish the removal of element 87, sleeve 86 is actuated to give an upthrust to die 83 which forces element 87 out of bore 82a. Thereafter sleeve 86 is returned until its flange 86a rests on the bevel of washer 84, and the dies are again in position to coact.

From the above it will be seen that the several stamping and forming dies of the different die units are readily removable for purposes of replacement by new dies of larger or smaller size as desired. It will also be seen that the method by which sleeves 24 and 26 of bearing 20 (Figure 1) may be formed, is one which may be easily and inexpensively practiced by unskilled labor.

Shell 23 of bearing 20 (Figure 1) is formed in a manner substantially similar to that described above, different dies, however, being used. An element similar to but longer than element 40 is stamped from flat stock 32. The dies used to form this element will have diameters suitable to impart to the new element an outside diameter slightly greater than the inner diameters of shells 24 and 26.

As more clearly shown in Figure 11, a male die generally indicated at 88 coacts with a female die generally indicated at 89 to stamp from an element 90 the bottom 90a thereof. Female die 89 is comprised of a carrier 91 having a frusto-conical bore 91a which receives a forming die 92. Die 92 has a bore 92a which communicates with a smaller concentric bore 92b which is sized to slidably receive a stamping die 88a removably associated with male die 88. Thus a shoulder 92c is provided, against which the bottom of element 90 rests. Preferably die 92 is held against the bottom of bore 91a by a clamp 93 through which extend bolts 94 threaded into carrier 91. Carrier 91 is also provided with a bore 91b which communicates with bore 92b to permit the egress of bottom 90a after it is stamped out.

Female die 89 may, if desired, be somewhat similar to female die 75 (Figure 9), that is, it may be equipped with ejecting apparatus to more readily remove shell 90. Thus shell 23 is rapidly and efficiently produced. As pointed out above with respect to sleeves 24 and 26, shell 23 will have smooth inner and outer surfaces equivalent to ground surfaces, because of the flowing of the metal during the forming or drawing operations. It will be noted that a strict adherence to desired size is readily achieved and the diameter tolerances may be kept down to a minimum, lower than would be practically possible in machining operations.

Under certain circumstances I have found it preferable to provide a bearing having a race comprised of two telescopically fitting shells. Accordingly I have provided a bearing generally indicated at 42 (Figure 12), having a race generally indicated at 43 comprised of a pair of telescopically fitting shells 44 and 45 within which a number of rolls 46 are disposed. Edges 44a and 44b of shell 40 are preferably slightly rounded to facilitate the disposition of bearing 42 into a bore provided for its reception. Extending radially toward the axis of bearing 42, I preferably provide a flange 47 preferably integral with shell 45 and a flange 48 preferably integral with shell 44. Flanges 47 and 48 are preferably wide enough to substantially cover the opposite ends of rolls 46 for the same purposes as pointed out above with respect to flanges 25 and 27 of bearing 20 in Figures 1, 3, and 4. Preferably shells 44 and 45 are related by a force or driven fit, thus obviating the necessity of providing securing means to retain the shells in related assembly.

The diameters of shells 44 and 45 and those of rolls 46 are preferably so proportioned that rolls 46 may be disposed in race 43 in overlapping relationship, that is, each roll acts as a keystone to prevent radial displacement of the rolls. As flanges 47 and 48 effectively prevent axial displacement of rolls 46, the bearing, once assembled, is immune from involuntary disassembly, thus greatly facilitating shipment of the bearing and installation thereof.

As the length of rolls 46 is preferably slightly less than the distance between flanges 47 and 48, and as the rolls, due to their keystone relationship, are in close proximity to one another, jamming of the rolls with each other or with race 43 is effectively precluded as the rolls cannot wander from their proper axes of rotation with respect to the axis of rotation of the bearing. Or, in other words, the axes of rotation of bearing 42 and rolls 46 are constantly parallel.

Shells 44 and 45 of race 43 may be formed in any suitable manner from any suitable material. However, I have found it preferable to stamp shells 44 and 45 from suitable sheet metal such as flat stock 32 in Figure 5 in a manner substantially similar to that hereinabove described with respect to shells 24 and 26 of bearing 20. The variance in the method of forming shells 44 and 45 lies in the use of dies similar in shape but differing in size from those described above. Accordingly the several male and female dies will be respectively longer and deeper and when shell 45 is being formed, the diameters of the dies will be less than the diameters of the dies employed in the formation of shell 44 in order that the telescopic force fit relation may be obtained.

Under certain conditions, I have found it preferable to employ a bearing having a different flange construction than that pointed out above. Referring to Figures 13 and 14, there is generally indicated at 49 a bearing having a race generally indicated at 50 within which are rotatably disposed a number of rolls 51 having reduced ends 51a. Race 50 is preferably comprised of a shell 52 having rounded or beveled edges 52a and 52b and a radial flange 53 extending inwardly toward the axis of bearing 49. Telescopically disposed within shell 52, and preferably related thereto by a force fit, is a shell 54 having a radial flange 55 extending inwardly toward the axis of bearing 49. Flanges 53 and 55 preferably have portions 53a and 55a respectively, which extend axially toward one another preferably at a suitable angle to register with reduced ends 51a of rolls 51. Thus where it is inconvenient to include the above-described keystone relation between the rolls, the provision of flanges 53 and 55 with their respective portions 53a and 55a serve in the double capacity of maintaining the rolls in related assembly against radial or axial displacement. It will also be seen that flanges 53 and 55 serve as a lubricant retainer and a guard against the admission of injurious foreign particles as pointed out above with respect to flanges 25 and 27 of bearing 20 in Figure 1.

Shells 52 and 54 are preferably formed from sheet metal in a manner substantially similar to that described hereinabove with respect to shells 44 and 45 of bearing 42. The final operation, however, differs in that dies of different shape are used.

As more clearly shown in Figure 15, a compound male die generally indicated at 95 is comprised of a cylindrical forming die 96 having therein a concentric bore 96a in which a stamping die 97 is slidably disposed. Forming die 96 has a flat bottom surface 96b preferably at right angles with the axis thereof and a surface 96c at a suitable angle with surface 96b, the degree of the angle depending on the angle desired to be imparted to portion 53a or 55a of flange 55 or 53 of bearing 49 (Figure 13). Thus it will be seen that male die 95 is substantially similar to male die 74 (Figure 9), the description of which will suffice for male die 95. A female die generally indicated at 98 coacts with male die 95 in the formation of shell 52 or 54. Female die 98 being substantially similar in construction and operation to female die 75 in Figure 9 with the exception of but one part, only that part will be described. Thus die 98 includes a forming die 99 differing from forming die 83 of female die 75 (Figure 9) in that the top of die 99 is shaped to conform to the bottom of forming die 96.

Thus when a blank such as element 40 (Figures 8 and 9) is operated on by dies 95 and 96, forming die 96 and stamping die 97 operate to form an element 100, a circular disc 100a being stamped therefrom by die 97. Element 100 has an irregular edge 100b, resulting from the flowing of the metal in previous forming operations, and when edge 100b is smoothed off in any suitable manner, either shell 52 or shell 54 results, depending on the respective diameters of the dies used. Thus shells 52 and 54 are formed, each having very smooth surfaces due to flowing of the metal as pointed out above with respect to the shells of bearings 20 and 42.

Thus it is evident that by forming the race of my bearing by the method set forth above, I achieve not only rapidity of manufacture of the several parts comprising the race but also great accuracy which ultimately results in strict uniformity of size in the completed bearing.

While the several bearings described hereinabove may be assembled in any suitable manner, I have found it preferable and convenient in the case of bearing 20 (Figure 1) to force sleeve 24 over shell 23 by an arborpress, for example, and thereafter insert into shell 23 a full quota of rolls 22. As rolls 22 lie in overlapping relation, their displacement could only occur in any axial direction away from flange 25. As the parts so far assembled are now seated in the press with flange 25 on the bottom, such displacement will not occur, and sleeve 26 may be readily forced into place over shell 23, thus completing the assembly of the bearing.

As the assembly of bearing 42 is substantially similar to that of bearing 49, only the assembly of bearing 42 will be described. Preferably shell 45 is placed on the table of a suitable arborpress or the like with flange 47 downward. A full quota of rolls 46 is then installed in shell 45 wherein they will sustain one another against radial displacement due to the abovementioned keystone relation. Thereupon shell 44 is forced down about shell 45 until it is in completely assembled relation therewith.

Under certain conditions, as, for example, where the bearing will be subjected to very heavy loads and extensive use, I have found it preferable to heat treat the sheet metal parts by a suitable tempering or case hardening process as desired. Upon being subjected to the high temperatures inherent in such processes, I have found that occasionally the sheet metal parts will warp slightly. This condition, however, is rectified in the assembly of the parts as any warping will be ironed out when one such part is pressed over another, and accordingly a very round and rigid bearing results.

Thus it will be seen that I have provided a bearing having a maximum roll capacity and accordingly an extremely high load capacity and long life in proportion to its size. Furthermore the manufacture of my bearing may be carried out on a high production basis characterized by minimum expense per unit due to absence of machining operations such as grinding or turning.

Accordingly I have provided a construction and a method of an essentially practical nature in which the several objects of this invention are attained.

As many other embodiments of the mechanical features of this invention may be made without departing from the scope thereof, and as the art herein described may be varied, it is to be understood that all matter herein set forth or shown in the accompanying drawings is to be interpreted as illustrative and not in a limiting sense.

I claim:

1. The herein described art which consists in forming a pair of flanged sheet metal sleeve members, the outer diameter of one being greater than the inner diameter of the other, forming a set of rolls of a diameter that, when the rolls are assembled about the inner surface of said first-mentioned sleeve member, each roll acts as a keystone to the others thereby to retain said rolls against radial displacement, inserting said rolls into said first-mentioned sleeve member, and telescopically force fitting said other sleeve member thereover.

2. The herein described art which consists in forming a flanged sleeve member, inturning the edge of the flange on said sleeve member, forming another flanged sleeve member, inturning the edge of the flange on said second-mentioned sleeve member, forming a plurality of rolls having reduced ends, inserting a complement of said rolls within said first-mentioned sleeve member thereby to position their peripheral surfaces on the tracking surface of said first-mentioned sleeve member and to position the adjacent reduced ends thereof against said first-mentioned inturned flanged edge to retain said rolls against radial and axial displacement, and force fitting said second-mentioned sleeve member telescopically over said first-mentioned sleeve member.

3. The herein described art which consists in blanking a plurality of cup shaped members from flat stock, reducing each of said members to increase the length and decrease the diameter thereof, sizing said members, perforating the closed end of each of said members to form a flange thereon, inserting a complement of rolls so formed as to act as keystones with respect to one another within one of said members, and telescopically force fitting another of said members about said first-mentioned member so that the flanges on both of said members register respectively with the opposite ends of said rolls.

4. The herein described art which consists in forming a pair of flanged sleeve members, the inner diameter of one being less than the outer diameter of the other, heat treating said sleeve members to alter the physical characteristics of the material thereof, inserting a complement of rolls in one of said members, and force fitting the other of said members over said first-mentioned member to retain said rolls against axial displacement and to correct any peripheral warping of the sleeve members occasioned by the heating thereof.

5. The herein described art which consists in forming an inner race member, forming an outer race member whose inner periphery is less than the outer periphery of the inner member, placing a plurality of anti-friction members within said inner member, inserting one end of said inner member into one end of said outer member, and applying substantial axial pressure on one of said members to force fit it into telescopic assembly with said other member, whereby peripheral inaccuracies in each member are rectified.

6. The herein described art which consists in forming a roll race, forming a pair of flanged sleeve members, inserting rolls in said race, and exerting substantial pressure axially on said members and said race to force fit said members over the opposite ends of said race whereby peripheral inaccuracies in each member are rectified.

7. The herein described art which consists in forming a roll race, forming a pair of flanged sleeve members, forming a complement of rolls of a diameter that when the rolls are assembled within said race each roll acts as a keystone to the other to prevent radial displacement thereof, inserting said rolls in said race, and forcing with substantial axial pressure said flanged sleeve member over the opposite ends of said race, whereby said race and said sleeve member are maintained in assembly by a force fit between their contiguous peripheries.

8. The herein described art which consists in blanking a cup-shaped member from flat stock, reducing said member to increase the length and decrease the diameter thereof, perforating the closed end of said member to form a flange thereon, forming a second member in a substantially similar manner, the outer periphery of the second member being greater than the inner diameter of the outer member, inserting a plurality of rolls in said second member, and applying substantial axial pressure on said first member to force fit it into telescopic assembly with said other member, whereby said members are maintained in assembly by a force fit between their contiguous peripheries.

9. The herein described art which consists in stamping a piece of sheet metal to form a cylindrical roll race, the tracking surface of which is continuous and unbroken axially and circumferentially, forming a flange and inturning the edge thereof at one end of said roll race, forming a plurality of rolling members having tapered ends, inserting a complement of said rolling members within said roll race thereby to position their peripheral surfaces on said tracking surface and to position the adjacent tapered ends thereof against said inturned flanged edge to retain said rolling members against radial displacement and axial displacement in an outward direction with respect to the flanged end of said roll race, and assembling a flanged portion on the other end of said race by exerting substantial pressure on said race in an axial direction to deform the metal which forms the race.

10. The herein described art which consists in forming a sheet metal cylindrical roll race the tracking surface of which is continuous and unbroken axially and circumferentially, forming a set of rolls, inserting said rolls within said roll race about said tracking surface, forming a flanged sheet metal sleeve member, and forcing with substantial axial pressure said flanged sleeve member over one end of said race to position the flange of said sleeve member in registry with one end of each of said rolls whereby said roll race and said sleeve member are maintained in assembly by a force fit between their contiguous peripheries.

11. The herein described art which consists in forming a pair of flanged sleeve members from sheet metal by stamping operations, the inner diameter of one member being less than the outer diameter of the other, inserting a complement of rolls in one of said members, and force fitting the other of said members over said first-mentioned member to retain said rolls against axial displacement and to correct any peripheral inaccuracies in the sleeve members resulting during the fabrication thereof.

12. The herein described art which consists in forming an inner race member, forming an outer race member whose inner periphery is less than the outer periphery of the inner member, forming a set of anti-friction elements of a diameter that when said elements are assembled about the inner surface of said inner race member each element acts as a keystone to the others to retain said elements against radial displacement, placing said anti-friction elements within said inner race member, inserting one end of said inner member into one end of said outer member, and applying substantial axial pressure on one of said members to force fit it into telescopic assembly with said other member.

13. The herein described art which consists in forming a pair of flanged sleeve members, forming a complement of rolls of a diameter that when the rolls are assembled within one of said sleeve members each roll acts as a keystone to the other to prevent radial displacement thereof, inserting said rolls in said one sleeve member, and telescopically fitting the other of said sleeve members over said one sleeve member to prevent axial displacement of the rolls.

14. The herein described art which consists in forming a roll race, forming a pair of flanged sleeve members, forming a complement of rolls of a diameter that when the rolls are assembled within said race each roll acts as a keystone to the other to prevent radial displacement thereof, inserting said rolls in said race, and telescopically fitting said sleeve members over the opposite ends of said race to prevent axial displacement of said rolls.

15. The method of making a roller bearing which consists in forming from sheet metal a cylindrical sleeve having at one end thereof an inwardly directed retaining flange with the free edge thereof bent axially of said sleeve and having at the other end thereof a substantially similar flange, placing in contact with a part of said sleeve a plurality of small diameter cylindrical rollers having reduced ends, with one reduced end of each roller disposed within said first-mentioned flange, and subjecting the second-mentioned flange to substantial axial pressure to force said flange into a relative position wherein its free edge overlies the adjacent reduced end of each of said rollers and contacts with said reduced ends, whereby to hold said rollers and sleeve as a unit.

16. The method of making a roller bearing which consists in forming from sheet metal a cylindrical sleeve having at one end thereof an inwardly directed retaining flange with the free edge thereof bent axially of said sleeve and having at the other end thereof a substantially similar flange, placing in contact with a part of said sleeve a plurality of small diameter cylindrical rollers having reduced ends, with one reduced end of each roller disposed within said first-mentioned flange, and subjecting the second-mentioned flange to substantial axial pressure to move said flange into registry with the adjacent ends of said rollers, whereby said flanges are fitted to the reduced ends of said rollers to hold the rollers and said sleeve as a unit.

LEWIS R. HEIM.

DISCLAIMER 2,102,460.—*Lewis R. Heim*, Mount Dora, Fla. METHOD OF MAKING ROLLER BEARINGS. Patent dated December 14, 1937. Disclaimer filed September 3, 1943, by the inventor.

Hereby enters this disclaimer to claims 9, 15, and 16 in said patent.

[*Official Gazette September 28, 1943.*]

with substantial axial pressure said flanged sleeve member over one end of said race to position the flange of said sleeve member in registry with one end of each of said rolls whereby said roll race and said sleeve member are maintained in assembly by a force fit between their contiguous peripheries.

11. The herein described art which consists in forming a pair of flanged sleeve members from sheet metal by stamping operations, the inner diameter of one member being less than the outer diameter of the other, inserting a complement of rolls in one of said members, and force fitting the other of said members over said first-mentioned member to retain said rolls against axial displacement and to correct any peripheral inaccuracies in the sleeve members resulting during the fabrication thereof.

12. The herein described art which consists in forming an inner race member, forming an outer race member whose inner periphery is less than the outer periphery of the inner member, forming a set of anti-friction elements of a diameter that when said elements are assembled about the inner surface of said inner race member each element acts as a keystone to the others to retain said elements against radial displacement, placing said anti-friction elements within said inner race member, inserting one end of said inner member into one end of said outer member, and applying substantial axial pressure on one of said members to force fit it into telescopic assembly with said other member.

13. The herein described art which consists in forming a pair of flanged sleeve members, forming a complement of rolls of a diameter that when the rolls are assembled within one of said sleeve members each roll acts as a keystone to the other to prevent radial displacement thereof, inserting said rolls in said one sleeve member, and telescopically fitting the other of said sleeve members over said one sleeve member to prevent axial displacement of the rolls.

14. The herein described art which consists in forming a roll race, forming a pair of flanged sleeve members, forming a complement of rolls of a diameter that when the rolls are assembled within said race each roll acts as a keystone to the other to prevent radial displacement thereof, inserting said rolls in said race, and telescopically fitting said sleeve members over the opposite ends of said race to prevent axial displacement of said rolls.

15. The method of making a roller bearing which consists in forming from sheet metal a cylindrical sleeve having at one end thereof an inwardly directed retaining flange with the free edge thereof bent axially of said sleeve and having at the other end thereof a substantially similar flange, placing in contact with a part of said sleeve a plurality of small diameter cylindrical rollers having reduced ends, with one reduced end of each roller disposed within said first-mentioned flange, and subjecting the second-mentioned flange to substantial axial pressure to force said flange into a relative position wherein its free edge overlies the adjacent reduced end of each of said rollers and contacts with said reduced ends, whereby to hold said rollers and sleeve as a unit.

16. The method of making a roller bearing which consists in forming from sheet metal a cylindrical sleeve having at one end thereof an inwardly directed retaining flange with the free edge thereof bent axially of said sleeve and having at the other end thereof a substantially similar flange, placing in contact with a part of said sleeve a plurality of small diameter cylindrical rollers having reduced ends, with one reduced end of each roller disposed within said first-mentioned flange, and subjecting the second-mentioned flange to substantial axial pressure to move said flange into registry with the adjacent ends of said rollers, whereby said flanges are fitted to the reduced ends of said rollers to hold the rollers and said sleeve as a unit.

LEWIS R. HEIM.

DISCLAIMER 2,102,460.—*Lewis R. Heim*, Mount Dora, Fla. METHOD OF MAKING ROLLER BEARINGS. Patent dated December 14, 1937. Disclaimer filed September 3, 1943, by the inventor.

Hereby enters this disclaimer to claims 9, 15, and 16 in said patent.

[*Official Gazette September 28, 1943.*]

DISCLAIMER 2,102,460.—*Lewis R. Heim*, Mount Dora, Fla. METHOD OF MAKING ROLLER BEARINGS. Patent dated December 14, 1937. Disclaimer filed September 3, 1943, by the inventor.

Hereby enters this disclaimer to claims 9, 15, and 16 in said patent.

*[Official Gazette September 28, 1943.]*